United States Patent
Sun (10) Patent No.: US 10,036,855 B1
(45) Date of Patent: Jul. 31, 2018

(54) REVERSE BIAS MODULATING WAVEGUIDE/DIODE

(71) Applicant: Chen-Kuo Sun, Escondido, CA (US)

(72) Inventor: Chen-Kuo Sun, Escondido, CA (US)

( * ) Notice: Subject to any disclaimer, the term of this patent is extended or adjusted under 35 U.S.C. 154(b) by 0 days.

(21) Appl. No.: 15/870,614

(22) Filed: Jan. 12, 2018

Related U.S. Application Data (63) Continuation-in-part of application No. 15/683,112, filed on Aug. 22, 2017, which is a continuation-in-part of application No. 15/649,094, filed on Jul. 13, 2017.

(51) Int. Cl.
| | | |
|---|---|---|
| *G02F 1/035* | (2006.01) | |
| *G02B 6/35* | (2006.01) | |
| *B23P 19/04* | (2006.01) | |
| *G02B 6/42* | (2006.01) | |

(52) U.S. Cl.
CPC ............ *G02B 6/3588* (2013.01); *B23P 19/04* (2013.01); *G02B 6/4202* (2013.01)

(58) Field of Classification Search
CPC ........ G02B 2006/12145; G02B 6/2813; G02B 6/29316; G02B 6/3536; G02B 2006/1209; G02F 2001/0152; G02F 1/015; G02F 1/01708
See application file for complete search history.

(56) References Cited

U.S. PATENT DOCUMENTS

| | | | | |
|---|---|---|---|---|
| 4,001,744 A | * | 1/1977 | Conrad ................. | H01H 36/00 335/205 |
| 4,008,947 A | * | 2/1977 | Baues ................... | G02F 1/3137 385/9 |
| 4,127,320 A | * | 11/1978 | Li ......................... | G02F 1/3137 385/16 |
| 4,240,693 A | * | 12/1980 | Johnson ................ | G02F 1/1506 385/18 |
| 4,525,687 A | * | 6/1985 | Chemla .................. | B82Y 20/00 257/189 |
| 4,728,167 A | * | 3/1988 | Soref ...................... | G02F 1/025 385/130 |

(Continued)

FOREIGN PATENT DOCUMENTS

| | | |
|---|---|---|
| CN | 2071793 U | 2/1991 |
| CN | 07043656 A | 2/1995 |

(Continued)

OTHER PUBLICATIONS

Hui Yu et al., "Performance tradeoff between lateral and interdigitated doping patterns for high speed carrier-depletion based silicon modulators", Optical Express, Jun. 4, 2012, vol. 20, No. 12, pp. 12926-12938.

(Continued)

*Primary Examiner* — Rhonda Peace (74) *Attorney, Agent, or Firm* — Nydegger & Associates (57) ABSTRACT

A waveguide/diode is manufactured by taking into account the effect that losses have on a multi-mode optical signal as it transits through the waveguide/diode. In particular, the loss effects that are caused by higher order modes in the optical signal as it passes back and forth through the cross charge region of a PN junction are considered. The consequent stretching of the cross coupling distance for the optical signal is then evaluated to minimize the required length for the waveguide/diode.

20 Claims, 6 Drawing Sheets

(56) References Cited

U.S. PATENT DOCUMENTS

| | | | | |
|---|---|---|---|---|
| 4,840,446 A * | 6/1989 | Nakamura | ............. | B82Y 20/00 257/21 |
| 5,004,447 A * | 4/1991 | Soref | .................... | G02F 1/3133 257/14 |
| 5,159,699 A * | 10/1992 | de Monts | ............. | G01N 33/564 385/130 |
| 5,917,980 A * | 6/1999 | Yoshimura | ............. | G02B 6/138 385/122 |
| 5,937,115 A * | 8/1999 | Domash | .................. | G02F 1/313 385/10 |
| 6,310,999 B1 * | 10/2001 | Marcuse | ................. | G02F 1/065 385/132 |
| 6,836,585 B2 | 12/2004 | Trissel | .................... | G02B 6/352 385/16 |
| 6,928,248 B2 * | 8/2005 | Achour | ................ | H04B 10/032 398/115 |
| 7,860,358 B2 * | 12/2010 | Tsuda | .................... | G02F 1/3132 385/16 |
| 9,046,704 B2 * | 6/2015 | Costache | ................ | G02F 1/313 |
| 2003/0219197 A1 * | 11/2003 | Kawamoto | ........... | G02F 1/1326 385/22 |
| 2003/0231394 A1 * | 12/2003 | Kimura | .................. | G09F 13/16 359/558 |
| 2004/0240784 A1 * | 12/2004 | Shih | ........................ | B82Y 20/00 385/31 |
| 2004/0247236 A1 * | 12/2004 | Yoshimura | ......... | G02B 6/12002 385/16 |
| 2005/0254752 A1 * | 11/2005 | Domash | .................. | G02F 1/313 385/37 |
| 2006/0261432 A1 * | 11/2006 | Yoshimura | ......... | G02B 6/12002 257/462 |
| 2007/0014519 A1 * | 1/2007 | Aoki | .................. | G02B 6/12002 385/50 |
| 2009/0263078 A1 * | 10/2009 | Hosomi | ............. | G02B 6/12004 385/14 |
| 2013/0034323 A1 * | 2/2013 | Costache | ................ | G02F 1/035 358/25 |
| 2014/0226974 A1 * | 8/2014 | Sun | .................... | H04B 10/5165 398/25 |
| 2015/0093067 A1 * | 4/2015 | Manouvrier | ........... | G02F 1/225 385/3 |
| 2017/0269454 A1 | 9/2017 | Sun | | |
| 2017/0336658 A1 * | 11/2017 | Chen | ....................... | G02F 1/025 |

FOREIGN PATENT DOCUMENTS

| | | |
|---|---|---|
| JP | 11237652 A | 8/1999 |
| SU | 1118878 A1 | 10/1984 |

OTHER PUBLICATIONS

F. Dollinger et al., "Ultrashort low-loss optical multiquantum-well GaAs/GaAlAs vertical directional coupler switch", Electronics Letters, Aug. 1, 1996, vol. 32, No. 16, p. 1509.

Asaki Kohtoku et al., "Switching Operation in a GaInAs—InP MQW Integrated-Twin-Guide (ITG) Optical Switch", IEEE Photonics Technology Letters, Mar. 1991, vol. 3, No. 3, pp. 225-226.

Masaki Kohtoku et al., "High-Speed InGaAlAs—InAlAs MQW Directional Coupler Waveguide Switch Modules Integrated with a Spotsize Converter Having a Lateral Taper, Thin-Film Core, and Ridge", Journal of Lightwave Technology, Mar. 2000, vol. 18, No. 3, pp. 360-369.

Herrera et al., "Silicon / electro-optic polymer hybrid directional coupler switch", Optical Interconnects XIV, 2014, Proc. of SPIE vol. 8991, pp. 89910Q-1-89910Q-8.

Stegmaier et al., "Broadband directional coupling in aluminum nitride nanophotonic circuits", Optics Express 7304, Mar. 25, 2013, vol. 21, No. 6.

Qiu et al., "A hybrid electro-optic polymer and TiO2 double-slot waveguide modulator", Scientc Reports, 5:8561, DOI 10.1038, srep08561.

* cited by examiner

REVERSE BIAS MODULATING WAVEGUIDE/DIODE

This application is a continuation-in-part of application Ser. No. 15/683,112, filed Aug. 22, 2017, which is currently pending, and which is a continuation-in-part of application Ser. No. 15/649,094, filed Jul. 13, 2017, which is currently pending. The contents of application Ser. Nos. 15/683,112 and 15/649,094 are incorporated herein by reference.

FIELD OF THE INVENTION

The present invention pertains generally to systems and methods for switching optical signals from one optical waveguide to another. More particularly, the present invention pertains to systems and methods for switching and modulating optical signals that have already been modulated by their second order mode as well as higher order modes as they transit a waveguide. The present invention is particularly, but not exclusively, useful for systems and methods that employ optical switches, wherein the switching element of the optical switch is a reverse bias diode.

BACKGROUND OF THE INVENTION

By definition, a PN junction is the interface between two regions in a semiconductor crystal which have been treated (i.e. doped) so that one region is a P-type semiconductor and the other is an N-type semiconductor; it contains a permanent dipole charge layer (McGraw-Hill Dictionary of Scientific and Technical Terms: Sixth Edition 2003). More particularly, from a technical perspective, the P-type region includes "holes" and the N-type region includes "electrons". In this combination, the permanent dipole charge layer (i.e. a space charge layer) is located between the regions.

As its nomenclature suggests, the space charge layer between the P-type region and the N-type region will be charged. Further, it will have a depletion width, $w_d$, that is initially determined by the electrical characteristics of the P-type and N-type regions. Importantly, it is known according to the plasma dispersion effect that the index of refraction of a semiconductor material will change as its free carrier concentration is changed. Therefore, the effective refractive index, n, of the PN diode will change as the depletion width $w_d$ is changed. It happens that these changes can be induced electronically by the application of an external voltage.

It is well known that semiconductor materials exhibit a phenomenon that is known as the plasma dispersion effect. In brief, this effect is related to the density of free electron carriers in a semiconductor material. More specifically, this free electron density is determined by the concentration of "electrons" in the N-type region of a PN junction, and by the concentration of "holes" in the N-type region of the PN junction. Of particular interest for the present invention is how the plasma dispersion effect changes the index of refraction of a semiconductor material, and the affect this change will have on an optical signal as it passes through a PN junction.

Along with a consideration of PN junctions as mentioned above, the characteristics of optical waveguides are also important for the present invention. In particular, the interest here is on the nature of light beams and their interaction with an optical waveguide. First, consider a single mode light beam which has no higher order modes and exhibits only what is generally referred to as the fundamental mode. As a distinguishing feature, it is well known that unlike a multi-mode light beam which always includes a fundamental mode together with higher order modes, a single mode light beam will follow a straight line path through an optical waveguide. On the other hand, a higher order mode light beam (e.g. second order mode) primarily will follow a sinusoidal path which passes back and forth across a center line through the optical waveguide due to mode propagation interference.

The present invention has recognized several possibilities from the technical considerations mentioned above that lead toward the use of an optical waveguide as a reverse bias switching/modulating diode. For one, the present invention recognizes that an optical waveguide, which is made of a semiconductor material (e.g. silicon), can be "doped" to create a PN junction. Specifically, both a P-type region and an N-type region, with a space charge layer therebetween, can be manufactured as an optical waveguide to effectively create a waveguide/diode. For another, the present invention recognizes that by introducing a higher order mode optical signal (e.g. second order) into the waveguide/diode, the sinusoidal beam path of the optical signal will cause it to transit back and forth through the space charge region. By changing the external voltage, the depletion width $w_d$ and its corresponding effective index n of the diode will change, and the beam path of the optical signal will be cumulatively changed as it passes back and forth through the space charge region in the waveguide/diode. Moreover, this change in beam path can then be effectively used to selectively direct (i.e. switch) the optical signal as an output from the waveguide/diode onto either of two output optical waveguides.

In light of the above, it is an object of the present invention to provide a reverse bias switching/modulating diode wherein the switching element is itself an optical waveguide. Another object of the present invention is to provide a reverse bias switching/modulating diode that effectively provides for optical switching of higher order mode optical signals. Yet another object of the present invention is to provide a reverse bias switching/modulating diode that is easy to manufacture, is simple to use, and is comparatively cost effective.

In another aspect of the pertinent technology, the present invention gives consideration to both the phase characteristics and the losses of an optical signal as it transits through an optical waveguide/diode.

Mathematically, these considerations are given in the expression for the waveguide/diode's index of refraction:

$$n = (n_o + \Delta n_o) + i(\alpha_o + \Delta \alpha_o)$$

In this expression $n_o$ and $\alpha_o$ are measures of the intrinsic properties of the waveguide/diode. On the other hand, $\Delta n_o$ and $\Delta \alpha_o$ respectively account for a plasma dispersion effect in the PN junction (phase factor) and losses due to absorption effects in the waveguide/diode (loss factor). An important consequence here is that when these factors are considered together, the index of refraction n varies along a cross-section dimension of the waveguide/diode due to free electron and hole distributions variations around the PN junction.

As disclosed above, an optical signal with higher order modes will follow a sinusoidal path as it transits through an optical waveguide/diode. An important characteristic of this path is the propagation interference distance $\lambda_c$ that is traveled by the optical signal, in a π cycle, as the optical signal travels from one side of the waveguide/diode to the opposite side of the waveguide/diode.

With the above in mind, when both phase and loss factors are considered, it is to be appreciated that the propagation interference distance $\lambda_c$ can be expressed as:

$$\lambda_c = \lambda_{cn} + \Delta\lambda_{cn} + \Delta\lambda_{c\alpha}$$

where, $\lambda_{on}$ is a constant that is set by the physical characteristics of the waveguide/diode, while $\Delta\lambda_{cn}$ and $\Delta\lambda_{c\alpha}$ are consequences of the phase and loss factors presented in the expression given above for the waveguide/diode's index of refraction, $n = (n_o + \Delta n_o) + i(\alpha_o + \Delta\alpha_o)$.

Specifically, in the expression for n given above, $\Delta\lambda_{cn}$ is an increment that is controlled by $\Delta n_o$, and $\Delta\lambda_{c\alpha}$ is an increment that is controlled by $\Delta\alpha_o$. Thus, during each transit of an optical signal through the PN junction of a waveguide/diode, the optical signal will experience a change in the propagation interference length $\Delta\lambda_c$ due to both phase and loss factors: i.e. $\Delta\lambda_c = \Delta\lambda_{cn} + \Delta\lambda_{c\alpha}$.

Importantly, because the fundamental mode of an optical signal is less attenuated than the higher order modes in the depletion region, $w_d$, of the PN junction, the fundamental mode has relatively less propagation loss during a T cycle. Accordingly, with less propagation loss, the energy in the fundamental mode is more pronounced. Consequently, $\Delta\lambda_{cn}$ remains relatively constant while $\Delta\lambda_{c\alpha}$ increases with propagation distance and the difference between the two, $\Delta\lambda_c$, also increases. Stated differently, $\lambda_c$ is distance-dependent and is effectively stretched as it transits the waveguide/diode. Moreover, these changes ($\Delta\lambda_{c\alpha}$ and $\Delta\lambda_{cn}$) are cumulative during the transit of the optical signal through the waveguide/diode.

SUMMARY OF THE INVENTION

In accordance with the present invention, an optical waveguide is created as a reverse bias switching/modulating diode for use as the switching element of an optical modulator. For this purpose, the optical waveguide is made as a PN junction using a semiconductor material (e.g. silicon) having an effective index of refraction n. During its manufacture, the optical waveguide is doped to create a P-type region and an N-type region. A consequence here is that a space charge region is also created between the two regions, and this space charge region will have a depletion width $w_d$ which is determined by the electrical characteristics of the P-type region and the N-type region. In this combination, the optical waveguide has a first end and a second end with the P-type region, the N-type region, and the space charge region, all extending together between the first and second ends of the waveguide. This construction effectively creates a waveguide/diode.

At least one optical input waveguide is connected to the first end of the waveguide/diode to provide an optical input signal that will transit through the waveguide/diode. As mentioned above, it is an important feature of the present invention that this optical input signal have a dominating higher order mode, e.g. a second order mode signal. Thus, to achieve this purpose for the present invention, two optical input waveguides need to be positioned at a predetermined location at the first end of the waveguide/diode. In particular, with the waveguide/diode defining a central axis, the predetermined location for connecting the two input optical waveguides to the waveguide/diode needs to be offset oppositely from the central axis by an offset distance $d_{offset}$. The input light beam is guided into one of the two input waveguides and it will be cross-coupled between the two waveguides to create a higher order mode input signal, when transitioning into the waveguide/diode section.

In addition to the optical input waveguide, the present invention envisions there will also be two output waveguides which are each attached to the second end of the waveguide/diode. Preferably, each of the optical output waveguides are attached to separate areas of the second end of the waveguide/diode, and they will be symmetrically positioned relative to the central axis of the waveguide/diode.

A voltage source is connected to the waveguide/diode on opposite sides of its space charge region to establish a reverse bias for the waveguide/diode when a base voltage $V_{base}$ is applied to the waveguide/diode. Thereafter, a switching voltage $V_\pi$ can be selectively added to (or subtracted from) $V_{base}$ to increase (decrease) the electric field in the space charge region. In the event, this also simultaneously changes the depletion width $w_d$ in the space charge region. With this change in the depletion width $w_d$ of the space charge region, the effective index of refraction n of the waveguide/diode also changes. As disclosed in greater detail below, this change in the effective index of refraction n, due to the change of depletion width $w_d$ in the space charge region, allows the present invention to direct the input optical signal onto a preselected output optical waveguide at the second end of the waveguide/diode.

For an operation of the present invention, the base voltage $V_{base}$, the switching voltage $V_\pi$ and the manufactured profile of the P-type region and the N-type region of the waveguide/diode will each, individually or collectively, account for the depletion width $w_d$ of the space charge region. Recall, it is the base voltage $V_{base}$ and the PN junction profile that establish the reverse bias for the waveguide/diode. On the other hand, it is the switching voltage $V_\pi$, alone, that operationally changes the depletion width $w_d$ and its corresponding free carrier concentration in the space charge region. According to the plasma dispersion effect, the change of free carrier concentration will change its corresponding index of refraction. Thus, the effective index of refraction n will be changed along with the switching voltage $V_\pi$. Importantly, when V has changed n, the path of a higher order mode optical signal will experience a change in its higher order mode propagation interference distance $\lambda_c$ each time it transits through the space charge region. Accordingly, this change of $\lambda_c$ is cumulative along a length L of the waveguide/diode. As a consequence, with an appropriate design consideration of $V_\pi$ and L, the present invention is able to direct the input optical signal from one output optical waveguide onto the other output optical waveguide.

Mathematically, considerations for the present invention include the recognition that the length L of the waveguide/diode, the higher order mode propagation interference distance $\lambda_c$, and the changes in $\lambda_c$ (i.e. $\Delta\lambda_c$), are related through the expressions: $L = N\lambda_c$ and $\lambda_c \cong (N \pm 1)\Delta\lambda_c$, where N is a positive real number greater than 10. For the present invention the length L is preferably greater than 100 μm and, preferably, $V_{base} + V_\pi < 10$ volts.

For an alternate embodiment of the present invention, the structure of a waveguide/diode incorporates a PN junction that can include two different semiconductor materials. Specifically, for the waveguide/diode of the alternate embodiment, a P-type region is made of a semiconductor material having a first plasma dispersion effect (e.g. silicon). Its N-type region is then made of a different semiconductor material which has a different plasma dispersion effect (e.g. InGaAsP). In combination, the two different semiconductor materials are bound directly to one another, or they can be separated and bounded (i.e. joined) together by an oxide layer (e.g. silica).

Operationally, the alternate embodiment functions as similarly disclosed for the preferred embodiment. The alternate embodiment, however, provides different electrical capabilities that allow for flexibility in the design and use of structural components for improved performance characteristics. In particular, a significant operational factor of the alternate embodiment is the fact that the plasma dispersion effect of the N-type region (e.g. InGaAsP) is more than two times greater in magnitude than that of the P-type region (e.g. silicon).

Due to the disparity between the respective plasma dispersion effects, the structural design features of the present invention that can be most easily varied to improve overall performance include: 1) the magnitude of the switching voltage $V_\pi$, which can be lower, and 2) the length L of the waveguide/diode, which can be shorter than is otherwise possible. Moreover, as will be appreciated by the skilled artisan, the operational parameters $V_\pi$ and L are interrelated by a figure of merit defined as $V_\pi L$. Thus, they can be respectively selected to balance each other.

In accordance with the present invention, the waveguide/diode is manufactured based on a collective consideration of all modes in an optical signal, i.e. the fundamental (first mode) as well as the higher order modes. In particular, consideration is directed to an index of refraction n for the waveguide/diode that accounts for a plasma dispersion effect in the PN junction and losses due to absorption effects in the waveguide/diode. Specifically, $n=(n_o+\Delta n_o)+i(\alpha_o+\Delta\alpha_o)$.

An important consequence of the index of refraction n is that the propagation interference distance $\lambda_c$ of the optical signal is seemingly stretched. Mathematically this consequence results from the fact that when both phase and loss factors are considered, the propagation interference distance $\lambda_c$ for a multi-mode optical signal can be expressed as: $\lambda_c=\lambda_{cn}+\Delta\lambda_{cn}+\Delta\lambda_{c\alpha}$. In this case, $\lambda_{cn}$ is a constant that is set by the physical characteristics of the waveguide/diode, while $\Delta\lambda_{cn}$ and $\Delta\lambda_{c\alpha}$ are consequences due to the phase and loss factors in the expression for the index of refraction n.

Operationally, when a voltage source is connected with the PN junction and provides a base voltage ($V=V_{base}$), n varies along the length L of the waveguide/diode. Thus, a distance-dependent propagation interference distance $\lambda_c$ is created for the optical signal. Further, when a switching voltage $V_\pi$ is selectively applied (i.e. $V=V_{base}+V_\pi$), a different distance-dependent, propagation interference distance $\lambda_c'$ is created for the optical signal. The result is a change in the distance-dependent interference distance, $\Delta\lambda_c$. In detail, $\Delta\lambda_c$ for the optical signal is equal to $\lambda_c'-\lambda_c$ (i.e. $\Delta\lambda_c=\lambda_c'\pm\lambda_c$). As envisioned for the present invention, with the change $\Delta\lambda_c$ the optical signal can be switched from one pathway to another at the length L in the waveguide/diode when $\int\Delta\lambda_c\approx\lambda_c$.

With the above considerations in mind, it happens that the length L necessary for switching an optical signal from one pathway to another has been found to be substantially less than the L required for a waveguide/diode when only phase factors are considered. Thus, it is possible to establish a shorter length L between the first end and the second end of the waveguide/diode to switch the optical signal from one pathway to another at the length L, when $\int\Delta\lambda_c\approx\lambda_c$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
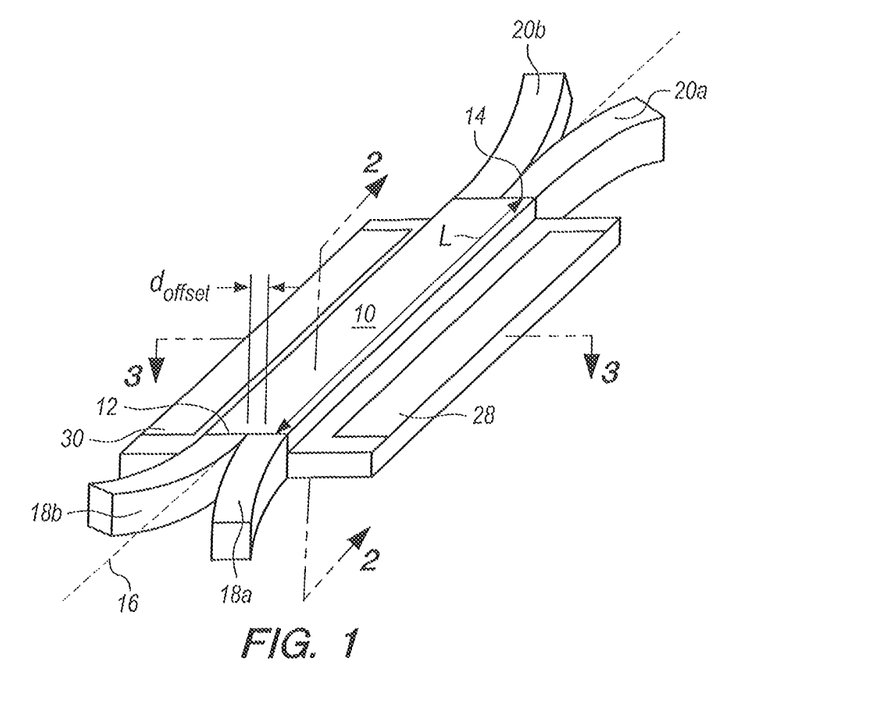
FIG. 1 is a perspective view of a waveguide/diode in accordance with the present invention.

Referring initially to FIG. 1, a waveguide/diode in accordance with the present invention is shown and is generally designated 10. Preferably, the waveguide/diode 10 is made of a semiconductor material, such as silicon. Also, as shown, the waveguide/diode 10 preferably has an elongated body portion that extends through a length L from a first end 12 to a second end 14, and it defines a central axis 16. Further, two input optical waveguides 18a and 18b are attached to the first end 12 of the waveguide/diode 10, and a pair of output optical waveguides 20a and 20b are attached to the second end 14 of the waveguide/diode 10.

Figure 2:
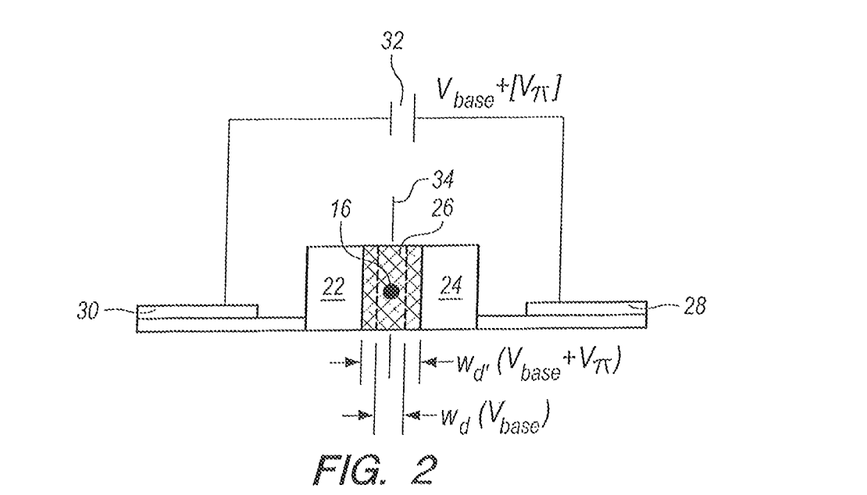
FIG. 2 is cross-section view of the waveguide/diode as seen along the line 2-2 in FIG. 1, showing a profile of the PN junction of the present invention.

By referring to FIG. 2, it will be appreciated that the waveguide/diode 10 includes a P-type region 22 and an N-type region 24, with a cross charge region 26 that is located between them. Functionally, for purposes of the present invention, the P-type region 22 and the N-type region 24 of the waveguide/diode 10, together with the cross charge region 26, present a typical PN profile that is like any PN junction known in the pertinent art. Further, like any diode known in the pertinent art, the waveguide/diode 10 of the present invention includes an anode 28 and a cathode 30 that are respectively connected with a voltage source 32. For the present invention, because the anode 28 (positive) is connected to the N-type region 24 of the waveguide/diode 10, and the cathode 30 (negative) is connected to the P-type region 22, the waveguide/diode 10 is reverse biased.

Still referring to FIG. 2, it is to be appreciated that the voltage source 32 will generate a base voltage $V_{base}$ which establishes the reverse bias for the waveguide/diode 10. In addition to $V_{base}$, the voltage source 32 will also provide a switching voltage $V_\pi$ that is necessary for an operation of the present invention. The importance here is that, as shown in FIG. 2, with only $V_{base}$ applied, the depletion width $w_d'$ of the cross charge region 26 will be different from the depletion width $w_\alpha'$ that results when the switching voltage $V_\pi V_\pi$ is applied. The consequence here is that as the switching voltage $V_\pi$ changes the depletion width between $w_d$ (dashed lines) and $w_\alpha'$ (solid lines), the effective index of refraction n of the waveguide/diode 10 having the cross charge region 26 will also be changed.

Figure 3:
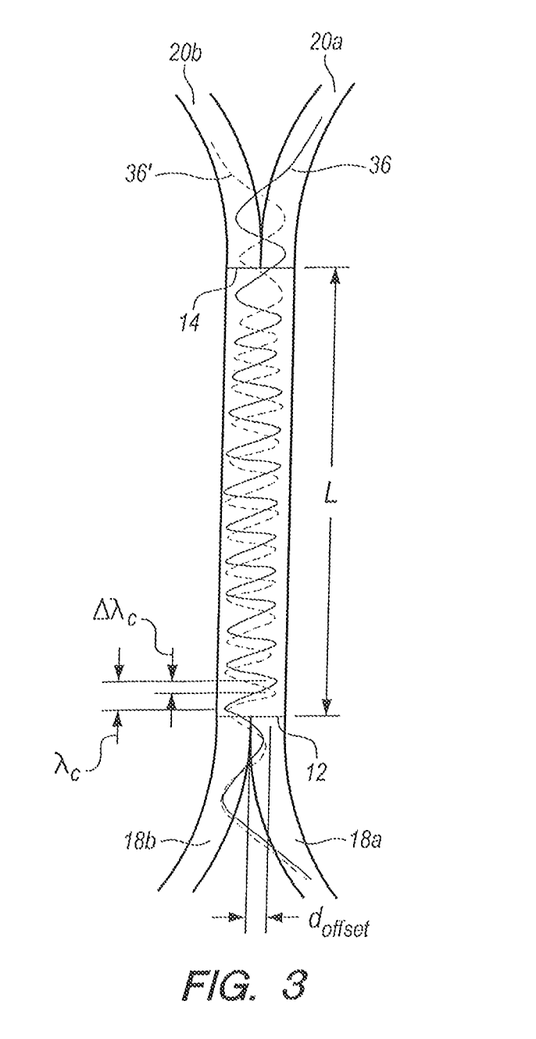
FIG. 3 is a cross-section view of the waveguide/diode as seen along the line 3-3 in FIG. 1 showing the difference in beam paths between a light beam that is influenced by a switching voltage $V_\pi$ (dashed line) and one that is not influenced (solid line)

In another aspect of the present invention, it is an important feature that the two input optical waveguides 18a and 18b be eccentrically attached to the first end 12 of the waveguide/diode 10. This attachment should be made at a predetermined location that is at an offset distance $d_{offset}$ from the central axis 16. Specifically, this is done to create higher order modes (e.g. in particular, a second order mode) for optical signals as they transit the length L of waveguide/diode 10. As best seen in FIG. 3, the purpose of creating a higher order mode for an optical signal is to have it proceed through the waveguide/diode 10 on a sinusoidal wave path 36/36' having a mode propagation interference length $\lambda_c$, rather than along a straight path as would be the case for an optical signal having only a single, fundamental mode.

For an operation of the present invention, an optical signal enters the waveguide/diode 10 from the input optical waveguide 18a. The signal can then be directed from the waveguide/diode 10 onto either the output optical waveguide 20a or the output optical waveguide 20b simply by applying, or withholding, the switching voltage $V_\pi$. Functionally, this happens because $V_\pi$ causes the depletion width $w_d$ of the cross charge region 26 to change. Consequently, the effective index of refraction n of the waveguide/diode 10 having the cross charge region 26 will also change. In turn, as the optical signal transits the length L of the waveguide/diode 10 back and forth through the cross charge region 26 in the plane 34, the second order mode propagation interference distance, $\lambda_c$, of the optical signal also changes by an increment of $\Delta\lambda_c$ as shown in FIG. 3. As all this happens, $\Delta\lambda_c$ is cumulative for each time the wave path 36/36' of the optical signal passes through the cross charge region 26. Accordingly, instead of following an unaltered wave path 36, the summation of $\Delta\lambda_c$ increases along the wave path 36' of the optical signal as it progresses through the waveguide/diode 10. The consequence for the wave path 36 of the optical signal is that it can be changed to a wave path 36' for directing the optical signal from one output optical waveguide 20a onto the other output optical waveguide 20b, or vice versa. Mathematical expressions to support this consequence are satisfied when L and N are selected such that switching occurs when $L=N\lambda_c$ and $\lambda_c \cong (N\pm 1)\Delta\lambda_c$, where N is a positive real number greater than 10.

Figure 4:
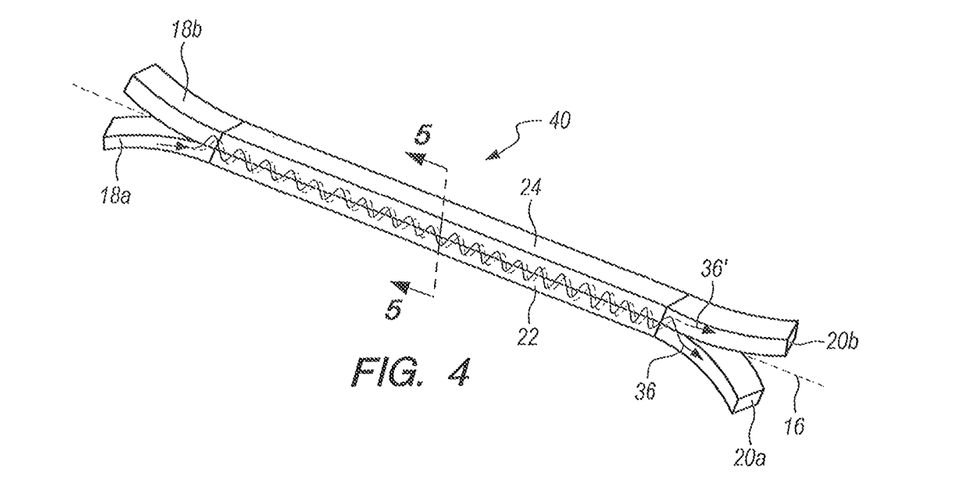
FIG. 4 is a perspective view of an alternate embodiment of the present invention.

Referring now to FIG. 4 an alternate embodiment for the waveguide/diode of the present invention is shown and is generally designated 40. As shown, the waveguide/diode 40 is structurally similar to the waveguide/electrode 10 disclosed above. Both waveguide/diodes 10 and 40 have a similar purpose, and they function similarly. They differ from each other in the nature of the materials used for their manufacture and their consequent electrical characteristics.

Figure 5:
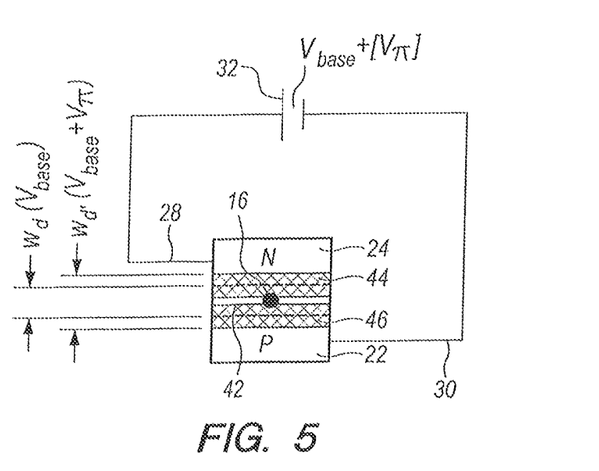
FIG. 5 is a cross-section view of the waveguide/diode as seen along the line 5-5 in FIG. 4.

In detail, the distinctive characteristics of the waveguide/diode 40 will be best appreciated with reference to FIG. 5.

With reference to FIG. 5 it is to be appreciated that the P-type region 22 and the N-type region 24 are made of different semiconductor materials. In particular, the difference is characterized by the fact that the regions 22 and 24 each exhibit a different plasma dispersion effect. Nevertheless, the P-type region 22 and the N-type region 24 need to be somehow bonded, or joined, together.

As shown in FIG. 5, the present invention envisions the use of an oxide layer 42 for the purpose of joining the regions 22 and 24 together. For example, the present invention envisions a PN junction wherein the N-type region 24 is made of a Multiple-quantum-well (MQM) material such as Indium-Gallium-Arsenide-Phosphide (InGaAsP). In combination with this N-type region 24, the P-type region 22 is envisioned to be silicon (Si), and the oxide layer 42 is silica ($SiO_2$). Other combinations of materials are, or course, possible. In each combination, however, it is important that the two materials are different, and that they will, accordingly, have different plasma dispersion effects.

A consequence of the waveguide/diode 40 is that the N-type region 24 will exhibit an N depletion region 44, and the P-type region 22 will exhibit a P depletion region 46. Together these regions 44 and 46 function similarly to the space charge region 26 of the waveguide/diode 10. In a variation for the alternate embodiment of the waveguide/diode 40, the present invention envisions in a different embodiment, an elimination of the oxide layer 42. In this case, the present invention envisions that the N-type region 24 and the P-type region 22 will be grown together.

In another embodiment of the present invention the current waveguide/diode can also be realized in a structure similar to that shown in FIG. 1 and FIG. 2. In this case, the PN junction waveguide/diode is made of a P-type region 22 from a first semiconductor material (e.g. poly-silicon), an N-type region 24 from a second semiconductor material (e.g. InGaAsP), and a buffer oxide material (e.g. silica) between the P-type semiconductor and the N-type semiconductor.

FIGS. 6A-D are to be considered collectively as they all pertain to the same multi-mode optical signal during its transit through the waveguide/diode 10. The import here, however, is not so much on distance traveled but rather on the back-and-forth changes in the location of energy in the waveguide/diode 10. In particular, these changes are most important relative to the effect caused by the cross charge region 26 of a PN junction in the waveguide/diode 10. With this in mind, the disclosure below regarding FIGS. 6A-D is directed to energy amplitudes of the various modes in a multi-mode optical signal.

Figure 6A:
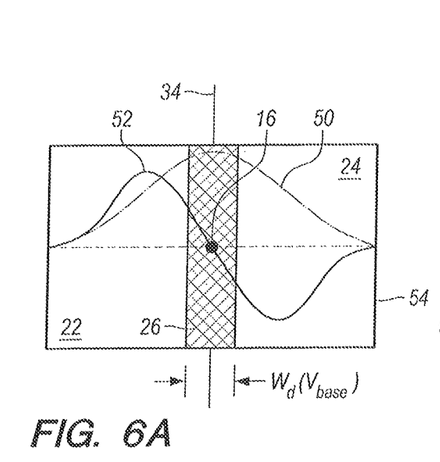
FIG. 6A is a graphical comparison showing exemplary energy amplitude levels of the first (fundamental) mode and the second order mode in an optical signal over a cross-section dimension of the waveguide/diode as seen along the line 2-2 in FIG. 1.

FIG. 6A depicts an energy amplitude 50 for the fundamental mode of a multi-mode optical signal, together with an energy amplitude 52 for the higher order modes (primarily second order) of the optical signal. In FIG. 6A, the energy amplitudes 50 and 52 are shown in a same cross-section 54 of the waveguide/diode 10 with their respective relationship to the cross charge region 26 of a PN junction. It is important to note in FIG. 6A that the energy amplitude 50 of the fundamental mode is less affected by the cross charge region 26 (i.e. plasma dispersion effect) than is the energy amplitude 52 of the higher order modes. Stated differently, the higher order modes are more attenuated.

Figure 6B:
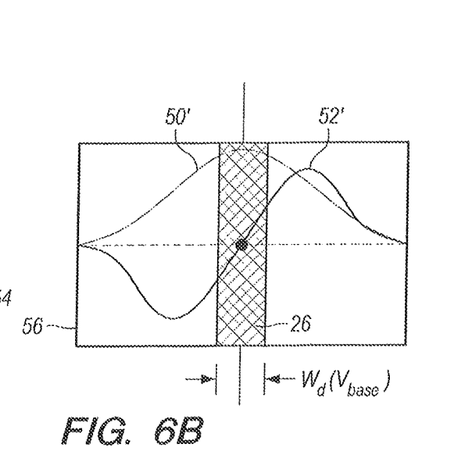
FIG. 6B is a graphical comparison showing exemplary energy amplitude levels in the first (fundamental) mode and the second order mode of the optical signal shown in FIG. 6A after one π cycle of the optical signal.

FIG. 6B depicts the optical signal at a subsequent cross-section 56, after the optical signal has completed a π cycle. At the cross-section 56 it is noted that the energy amplitude 50' of the optical signal is substantially unchanged and is similar to the previous energy amplitude 50 profile it had at cross-section 54 (FIG. 6A). On the other hand, unlike the fundamental mode, the higher order modes have actively interacted with the cross charge region 26. Accordingly, the profile of the energy amplitude 52' for the higher order modes has changed. The consequence here is two-fold. For one, because the energy amplitudes 50 and 52 for the optical signal are cumulative, the combined energy amplitude 58 for the optical signal effectively follows the frequency of the fundamental mode. For another, due to its increased interaction with the cross charge region 26, the higher order modes experience greater losses.

Figure 6C:
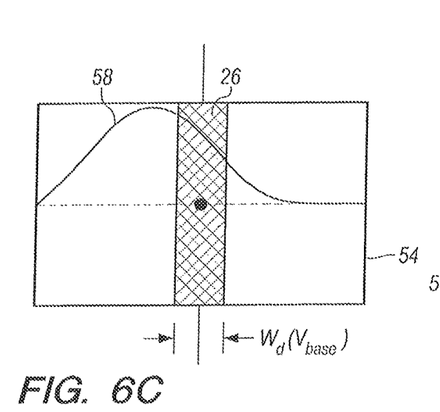
FIG. 6C is a depiction of the effect of the combined energy amplitude levels shown in FIG. 6A.
Figure 6D:
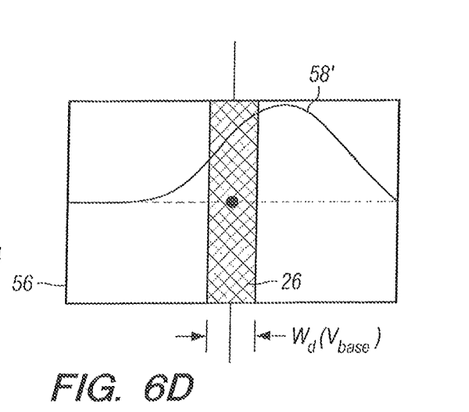
FIG. 6D is a depiction of the effect of the combined energy amplitude levels shown in FIG. 6B.

With reference to FIGS. 6C and 6D, it will be seen that the combined (total) energy 58 in an optical signal stays relatively constant in amplitude, but changes location in the waveguide/diode 10. Specifically, FIG. 6C shows the combined (total) energy amplitude 58 of the optical signal at cross section 54, and FIG. 6D shows the combined (total) energy amplitude 58' of the optical signal at cross-section 56. Thus, the optical signal is shown to effectively go back and forth from one cross-section (e.g. cross-section 54) to another (e.g. cross-section 56), and vice versa. As it does so, it transits through the cross charge region 26 of the waveguide/diode 10. With this in mind it is important to note that, from an energy perspective, the fundamental mode dominates and remains constant. The higher order modes, however, are more attenuated and thereby introduce continuously increasing losses.

Figure 7:
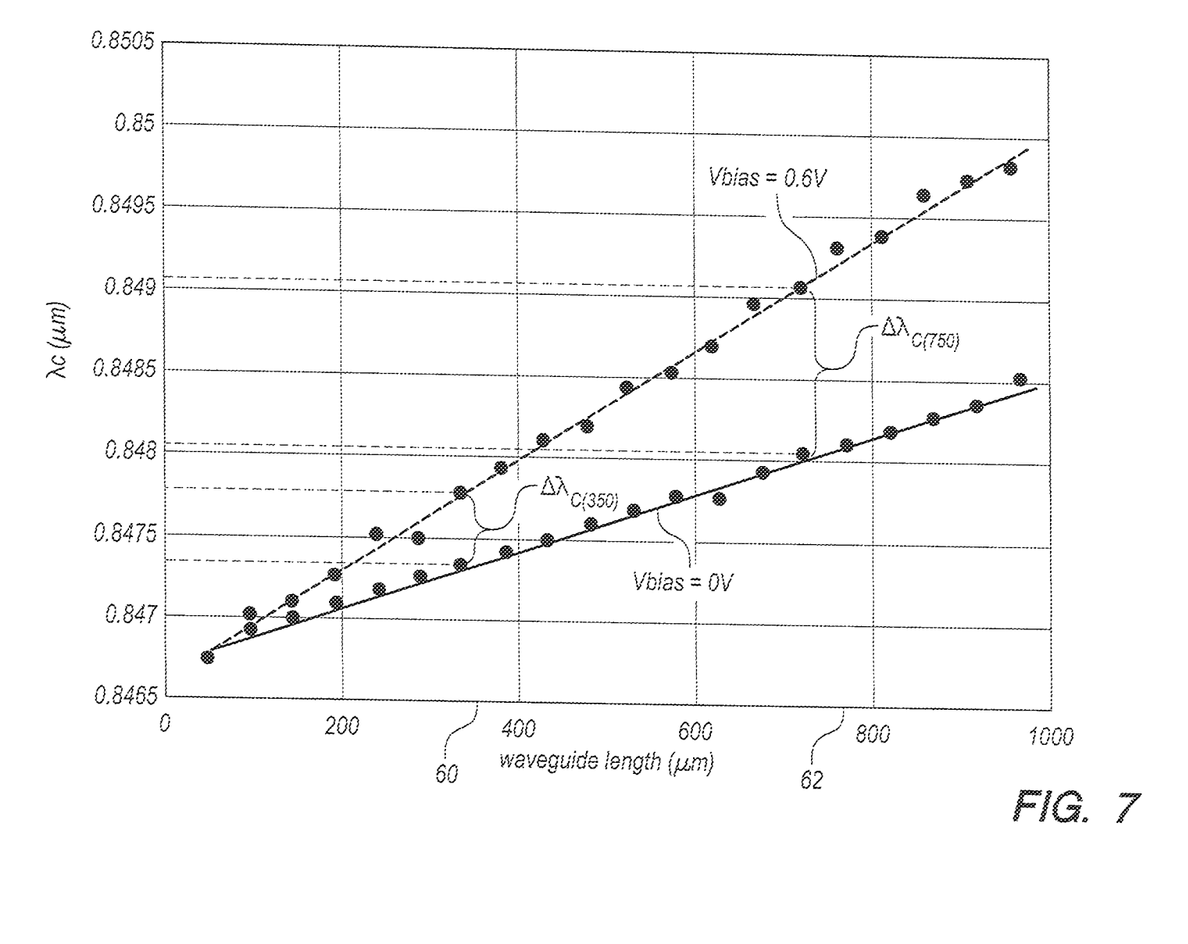
FIG. 7 is a representative graph showing changes in the interference length $\lambda_c$ of an optical signal relative to waveguide/diode length under the influence of a change in voltage bias from the voltage source.

Referring now to FIG. 7, the distance-dependent, propagation interference changes, $\Delta\lambda_c$, are shown relative to the waveguide length L. In particular, these changes $\Delta\lambda_c$ are shown as a consequence in the bias voltage V. Of importance here is the fact that $\lambda_c$ itself changes at different rates, depending on the bias voltage V. The result of this is that the total $\Delta\lambda_c$ for a given length of waveguide/diode 10 is an integration of $\Delta\lambda_c$ along the given length, $\int\Delta\lambda_c$.

By way of example, consider the change in propagation interference distance $\Delta\lambda_{c(350)}$ at the point 60 on the waveguide/diode 10, i.e. when an optical signal has traveled 350 μm along the length L of the waveguide/diode 10. As indicated in FIG. 7, at the point 60, $\lambda_{c(350)}$ will have an approximated value of 0.8473 under the influence of a bias voltage of zero volts. On the other hand, $\lambda_{c(350)}$ will have a value of 0.8478 when the waveguide/diode 10 is under the influence of a bias voltage of 0.6 volts. The difference here produces a change in the interference distance $\Delta\lambda_{c(350)}$ of approximately 0.0005 μm. Now consider the propagation interference distance $\Delta\lambda_{c(750)}$ at point 62 on the waveguide/diode 10. At this time the same optical signal has traveled another 400 μm along the length L of the waveguide/diode 10 to the point 62. Again, depending of the voltage bias, at the point 62, $\lambda_{c(750)}$ will have a value of 0.8481 under the influence of a bias voltage of zero volts. On the other hand, $\lambda_{c(750)}$ will have a value of 0.8491 under the influence of a bias voltage of 0.6 volts. The difference here produces a change in the interference distance $\Delta\lambda_{c(750)}$ of approximately 0.0010 μm. Note: $\lambda_{c(750)}$ is approximately twice the interference distance $\Delta\lambda_{c(750)}$.

Figure 8:
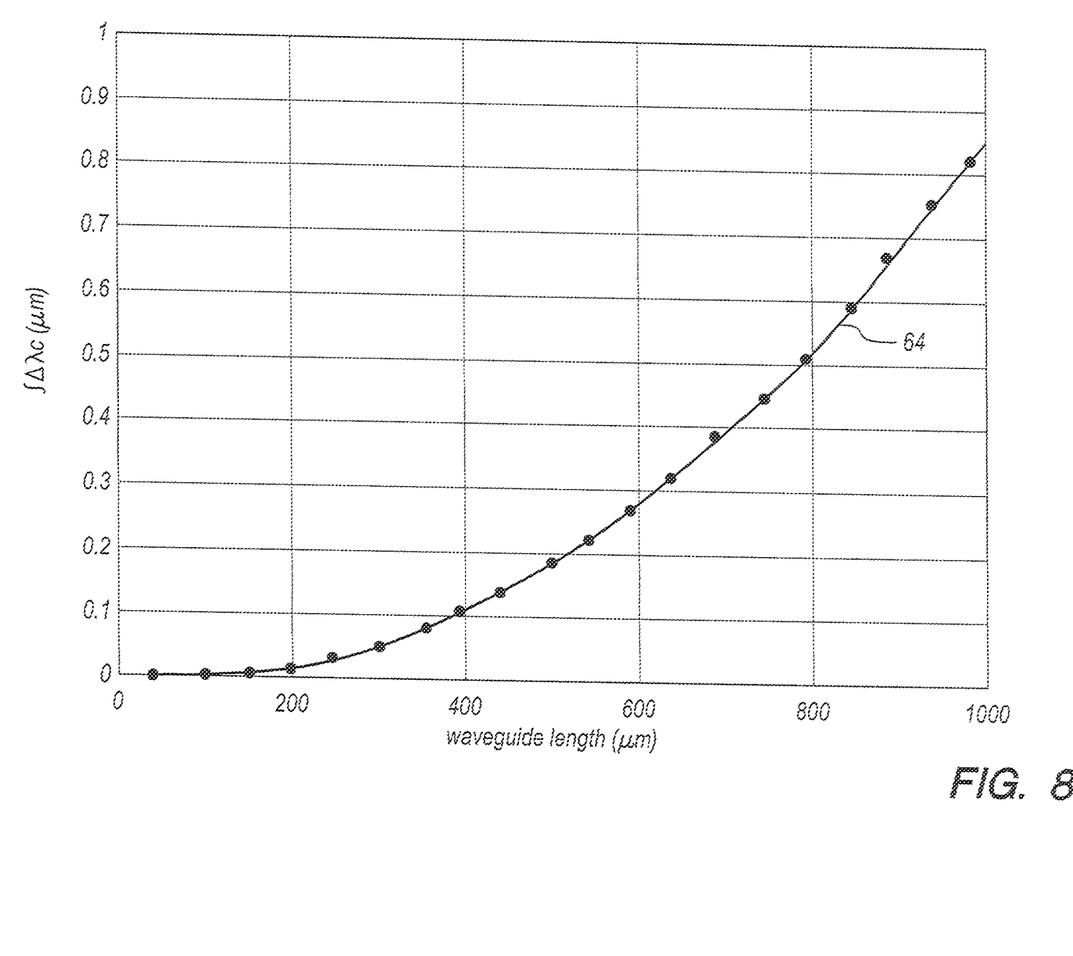
FIG. 8 is a graph showing the cumulative change in the interference length $\lambda_c$ of an optical signal as a function of waveguide length caused by a change in voltage bias as indicated in FIG. 7.

With the consequences of FIG. 7 in mind, FIG. 8 shows the integrated effect. Again by way of example, FIG. 8 shows that $\int\Delta\lambda_c$ results in a variation of $\lambda_c$ through a length L of the waveguide/diode 10 that is substantially a parabolic curve 64. This is so because $\Delta\lambda_c$ increases dramatically as the length L increases. Specifically, the values given in FIG. 8 are for a waveguide/diode 10 having a length L=1000 μm, with voltage changes between $V_{base}$=0 volts and a switching voltage $V_\pi$=0.6 volts. The result is an overall $\int\Delta\lambda_c$ that is equal to approximately 0.85 μm. Compare these values with those of FIG. 7 for a waveguide/diode 10 having an index of refraction n that creates a distance-dependent, propagation interference distance $\lambda_c$. Specifically, for the example given, it is shown that the waveguide/diode 10 will switch a multi-mode optical signal from one pathway to another when $\int\Delta\lambda_c = \lambda_c$.

While the particular Improved Reverse Bias Modulating Waveguide/Diode as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for switching an optical signal from one pathway to another, the optical signal having a fundamental (first order) mode and higher order modes, the device comprising:

an optical waveguide/diode switch having a first end and a second end with a length L therebetween and a dimension in a cross-section along its length L in the order of the optical signal wavelength, wherein the waveguide/diode defines an axis and includes a PN junction having a space charge region with a depletion width $w_d$, wherein the PN junction is centered on the axis and extends along the length L, and wherein the waveguide/diode has an index of refraction n accounting for a plasma dispersion effect in the PN junction and losses due to absorption effects in the waveguide/diode, n=$(n_o+\Delta n_o)+i(\alpha_o+\Delta\alpha_o)$, where n varies along the length L of the waveguide/diode to establish a distance-dependent, propagation interference distance $\lambda_c$ for the optical signal; and a voltage source connected with the PN junction to provide a base voltage (V=$V_{base}$) with a consequent distance-dependent, propagation interference distance $\lambda_c$ for the optical signal, and further wherein the voltage source selectively provides a switching voltage $V_\pi$ (V=$V_{base}+V_\pi$) to establish a distance-dependent, propagation interference distance $\lambda_c'$ for the optical signal with a change in the distance-dependent interference length equal to $\Delta\lambda_c(\Delta\lambda_c = \lambda_c' \pm \lambda_c)$ for the optical signal to switch the optical signal from one pathway to another at the length L in the waveguide/diode where $\int\Delta\lambda_c \approx \lambda_c$.

2. The device of claim 1 wherein the waveguide/diode is a reverse bias diode.

3. The device of claim 1 wherein the distance-dependent, propagation interference distance $\lambda_c$ results from a modal interference between the fundamental (first order) mode and a second order mode.

4. The device of claim 1 wherein the propagation interference distance $\lambda_c$ for a multi-mode optical signal is expressed as $\lambda_c = \lambda_{cn} + \Delta\lambda_{cn} + \Delta\lambda_{c\alpha}$, wherein $\lambda_{cn}$ is a constant set by the physical characteristics of the waveguide/diode, $\Delta\lambda_{cn}$ is a consequence of phase considerations in the index of refraction n, and $\Delta\lambda_{c\alpha}$ is a consequence of loss considerations in the index of refraction n.

5. The device of claim 4 wherein the index of refraction varies along the cross-section dimension of the waveguide/diode due to free electron and hole distributions variations around the PN junction.

6. A method for manufacturing a device to switch an optical signal from one pathway to another, the optical signal having a fundamental (first order) mode and higher order modes, the method comprising the steps of:
- providing an optical waveguide/diode, wherein the waveguide/diode defines an axis and has a PN junction oriented on the axis to create a propagation interference distance $\lambda_c$ for the optical signal;
- determining a distance-dependent change, $\Delta\lambda_c$, in the propagation interference distance $\lambda_c$ for the waveguide/diode, wherein $\Delta\lambda_c$ equals the difference between the interference distance $\lambda_c$ established for the waveguide/diode when a first voltage is applied across the PN junction, and an interference distance $\lambda_c'$ established for the waveguide/diode when a second voltage is applied across the PN junction ($\Delta\lambda_c=\lambda_c'\pm\lambda_c$); and
- establishing a length L for the waveguide/diode between a first end and a second end thereof, to switch the optical signal from one pathway to another at the length L, where $\int\Delta\lambda_c\approx\lambda_c$.

7. The method of claim 6 wherein the waveguide/diode has a dimension in a cross-section along its length L in the order of the optical signal wavelength.

8. The method of claim 6 where in the PN junction has a space charge region with a depletion width $w_d$, wherein the PN junction is centered on the axis and extends along the length L, and wherein the index of refraction n accounts for a plasma dispersion effect in the PN junction and losses due to absorption effects in the waveguide/diode.

9. The method of claim 8 wherein $n=(n_o+\Delta n_o)+i(\alpha_o+\Delta\alpha_o)$, and n varies along the length L of the waveguide/diode to establish the distance-dependent, propagation interference distance $\lambda_c$ for the optical signal.

10. The method of claim 9 wherein the propagation interference distance $\lambda_c$ for a multi-mode optical signal is $\lambda_c=\lambda_{cn}+\Delta\lambda_{cn}+\Delta\lambda_{c\alpha}$ wherein $\lambda_{cn}$ is a constant that is set by the physical characteristics of the waveguide/diode, $\Delta\lambda_{cn}$ is a consequence of phase considerations in the index of refraction n, and $\Delta\lambda_{c\alpha}$ is a consequence of loss considerations in the index of refraction n.

11. The method of claim 6 wherein the waveguide/diode is a reverse bias diode.

12. The method of claim 6 wherein the first voltage is a base voltage ($V=V_{base}$) and the second voltage is a switching voltage $V_\pi$ ($V=V_{base}+V_\pi$).

13. The method of claim 6 wherein the distance-dependent, propagation interference distance $\lambda_c$ results from a modal interference between the fundamental (first order) mode and a second order mode.

14. A method for manufacturing a device to switch an optical signal from one pathway to another, the optical signal having a fundamental (first order) mode and higher order modes, the method comprising the steps of:
- providing an optical waveguide/diode having a first end and a second end, wherein the waveguide/diode defines an axis and includes a PN junction having a space charge region with a depletion width $w_d$, wherein the PN junction is centered on the axis, and wherein the waveguide/diode has an index of refraction n accounting for a plasma dispersion effect in the PN junction and losses due to absorption effects in the waveguide/diode, with a consequent distance-dependent propagation interference distance $\lambda_c$ for transit of the optical signal along the axis through the waveguide/diode;
- connecting a voltage source with the PN junction to provide a base voltage ($V=V_{base}$) with a consequent distance-dependent, propagation interference distance $\lambda_c$ for the optical signal, and further to selectively provide a switching voltage $V_\pi$ ($V=V_{base}+V_\pi$) to establish a distance-dependent, propagation interference distance $\lambda_c'$ for the optical signal, with a change in the distance-dependent interference distance equal to $\Delta\lambda_c$ ($\Delta\lambda_c=\lambda_c'\pm\lambda_c$); and
- establishing a length L between the first end and the second end of the waveguide/diode to switch the optical signal from one pathway to another at the length L, where $\int\Delta\lambda_c\approx\lambda_c$.

15. The method of claim 14 wherein $n=(n_o+\Delta n_o)+i(\alpha_o+\Delta\alpha_o)$, and n varies along the length L of the waveguide/diode to establish the distance-dependent, propagation interference distance $\lambda_c$ for the optical signal.

16. The method of claim 15 wherein the propagation interference distance $\lambda_c$ for a multi-mode optical signal is $\lambda_c=\lambda_{cn}+\Delta\lambda_{cn}+\Delta\lambda_{c\alpha}$ wherein $\lambda_{cn}$ is a constant that is set by the physical characteristics of the waveguide/diode, $\Delta\lambda_{cn}$ is a consequence of phase considerations in the index of refraction n, and $\Delta\lambda_{c\alpha}$ is a consequence of loss considerations in the index of refraction n.

17. The method of claim 14 wherein the waveguide/diode has a dimension in a cross-section along its length L in the order of the optical signal wavelength.

18. The method of claim 14 wherein the waveguide/diode is a reverse bias diode.

19. The method of claim 14 wherein the distance-dependent, propagation interference distance $\lambda_c$ results from a modal interference between the fundamental (first order) mode and a second order mode.

20. The method of 14 wherein the index of refraction varies along the cross-section dimension of the waveguide/diode due to free electron and hole distributions variations around the PN junction.

* * * * *

UNITED STATES PATENT AND TRADEMARK OFFICE
CERTIFICATE OF CORRECTION

PATENT NO. : 10,036,855 B1
APPLICATION NO. : 15/870614
DATED : July 31, 2018
INVENTOR(S) : Chen-Kuo Sun It is certified that error appears in the above-identified patent and that said Letters Patent is hereby corrected as shown below:

In the Specification

Column 2, Line 62 - after the word "a" and before the word "cycle" DELETE "IT" and INSERT -- $\pi$ --.

Column 3, Line 5 - after the word "where," and before the word "is" DELETE "$\lambda_{on}$" and INSERT -- $\lambda_{cn}$ --.

Column 3, Line 11 - after the word "and" and before the word "is" DELETE "$\Delta\lambda_{co}$" and INSERT -- $\Delta\lambda_{c\alpha}$ --.

Column 3, Line 20 - after the word "a" and before the word "cycle" DELETE "T" and INSERT -- $\pi$ --.

Column 4, Line 39 - after the word "when" and before the word "has" DELETE "V" and INSERT -- $V_\pi$ --.

Column 7, Line 9 - after the word "width" and before the word "of" DELETE "$w_d'$" and INSERT -- $w_d$ --.

Column 7, Line 11 - after the word "width" and before the word "that" DELETE "$w_\alpha'$" and INSERT -- $w_d'$ --.

Column 7, Line 11 - after the word "voltage" and before the second use of "$V_\pi$" and DELETE "$V_\pi$".

Column 7, Line 14 - after the word "and" and before the words "(solid lines)" DELETE "$w_\alpha'$" and INSERT -- $w_d'$ --.

Signed and Sealed this
Twenty-fifth Day of September, 2018

Andrei Iancu
*Director of the United States Patent and Trademark Office*